United States Patent
Csonka

(10) Patent No.: US 11,984,935 B2
(45) Date of Patent: May 14, 2024

(54) ALGORITHMIC CORRECTION FOR OPTICAL CROSS-COUPLING

(71) Applicant: X Development LLC, Mountain View, CA (US)

(72) Inventor: Paul Csonka, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/940,417

(22) Filed: Sep. 8, 2022

(65) Prior Publication Data

US 2024/0097797 A1    Mar. 21, 2024

Related U.S. Application Data

(60) Provisional application No. 63/303,086, filed on Jan. 26, 2022.

(51) Int. Cl.
*H04B 10/80* (2013.01)
*H04B 10/112* (2013.01)
*H04B 10/61* (2013.01)

(52) U.S. Cl.
CPC ....... *H04B 10/803* (2013.01); *H04B 10/1129* (2013.01); *H04B 10/6165* (2013.01)

(58) Field of Classification Search
CPC .............. H04B 10/803; H04B 10/1129; H04B 10/6165
USPC ........................................................ 398/118
See application file for complete search history.

(56) References Cited

U.S. PATENT DOCUMENTS

| | | | |
|---|---|---|---|
| 7,274,442 B2 | 9/2007 | Dolne et al. | |
| 9,778,448 B2 | 10/2017 | Chann | |
| 10,135,527 B1* | 11/2018 | Csonka | H04B 10/11 |
| 10,461,967 B1* | 10/2019 | Ahmed | H04L 25/03057 |
| 10,871,639 B2 | 12/2020 | Chann | |
| 11,005,565 B1* | 5/2021 | Mitchell | H04B 10/1123 |

(Continued)

FOREIGN PATENT DOCUMENTS

WO    2012167135 A1    12/2012

OTHER PUBLICATIONS

Chen et al.; Highly sensitive fiber coupling for free-space optical communications based on an adaptive coherent fiber coupler; Aug. 2018; Optics Communications; pp. 1-4. (Year: 2018).*

(Continued)

*Primary Examiner* — Amritbir K Sandhu
(74) *Attorney, Agent, or Firm* — Botos Churchill IP Law LLP

(57) ABSTRACT

The disclosure provides a method for adjusting an optical link alignment of a first communication device with a remote device. The method includes transmitting or receiving an optical signal; receiving one or more measurements of at least one environmental factor at the first communication device or the remote device; and receiving or detecting an apparent amount of alignment of the optical signal. Then, by one or more processors of the first communication device, determining an estimated error attributable to optical cross coupling and an actual amount of alignment of the optical signal based on the apparent amount of alignment and the estimated error. Next, adjusting the first communication device based on the actual amount of alignment to correct for optical cross coupling.

20 Claims, 8 Drawing Sheets

(56) References Cited

U.S. PATENT DOCUMENTS

| | | | | |
|---|---|---|---|---|
| 11,290,183 | B2* | 3/2022 | Dickson | H04B 10/1123 |
| 2012/0308239 | A1* | 12/2012 | Sheth | H04B 10/1125 |
| | | | | 398/131 |
| 2013/0208361 | A1* | 8/2013 | Chann | G02B 27/1006 |
| | | | | 359/615 |
| 2016/0043800 | A1* | 2/2016 | Kingsbury | H04B 7/18513 |
| | | | | 398/125 |
| 2019/0049743 | A1* | 2/2019 | Akiyama | G02B 6/2773 |
| 2019/0101392 | A1 | 4/2019 | Bischel et al. | |
| 2023/0318705 | A1* | 10/2023 | Csonka | H04B 10/1123 |
| | | | | 398/131 |

OTHER PUBLICATIONS

Carrizo, Carlos E., "Advanced Adaptive Compensation System for Free-Space Optical Communications", Universitat Politècnica De Catalunya, Department of Signal Theory and Communications, 2019, pp. 1-177.

Hodges, Richard E., et al., "A Deployable High-Gain Antenna Bound for Mars", IEEE Antennas & Propagation Magazine, 2017, pp. 39-49.

Kingsbury, Ryan, et al., "Design of a Free-Space Optical Communication Module for Small Satellites", 28th Annual AIAA/USU, Conference on Small Satellites, 2014, pp. 1-10.

Moosavi, Seyed Ayoob, et al., "Improvement of coupling efficiency in free space optical communication with a multi actuator adaptive lens", ResearchGate, Optics Letters, 2019, pp. 1-6.

Podoliak, Nina, et al., "Subwavelength line imaging using plasmonic waveguides", Optoelectronics Research Centre, University of Southampton, Nanobiophysics (NBP), MESA+ Institute for Nanotechnology, Complex Photonic Systems (COPS), MESA+ Institute for Nanotechnology, 2014, pp. 1-7.

Tymchenko, M., et al., "Advanced control of nonlinear beams with Pancharatnam-Berry metasurfaces", American Physical Society, Physical Review B 94, 2016, pp. 214303-1-13.

Yu, Lin, et al., "Free-Space to Fiber Coupling of Electromagnetic Gaussian Schell-Model Beams in Turbulent Marine Atmospheric Channel", IEEE Photonics Journal, vol. 10, No. 6, 2018, pp. 1-10.

International Search Report and Written Opinion for International Application No. PCT/US2022/052522 dated Apr. 14, 2023 (12 pages).

Cowan, William D, "Foundry Microfabrication of Deformable Mirrors For Adaptive Optics", AFIT/DS/ENG/98-07, Graduate School of Engineering of the Air Force Institute of Technology, Air Education and Training Command, 1998, pp. 1-276.

Mekhiel, Christopher, et al., "Monolithic Silicon-on-Insulator Optical Beam Steering with Phase Locking Heterodyne Feedback", Department of Electrical and Computer Engineering Ryerson University, Toronto, Canada, Downloaded on Oct. 18, 2022 at 23:46:08 UTC from IEEE Xplore, pp. 1-5.

Thompson, A.R., "An Introduction to the VLA Electronic System", VIA Technical Report No. 29, 1977, pp. 1-100.

* cited by examiner

700

800

ALGORITHMIC CORRECTION FOR OPTICAL CROSS-COUPLING

CROSS-REFERENCE TO RELATED APPLICATIONS

This application claims the benefit of the filing date of U.S. Provisional Application No. 63/303,086, filed Jan. 26, 2022, the entire disclosure of which is incorporated by reference herein.

BACKGROUND

Communication terminals may transmit and receive optical signals or beams through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The pointing accuracy is adversely affected by disturbances experienced by the communication system. Such disturbances can cause optical cross coupling (OCC). OCC is a function of beam width and transmission distance. In certain optical communication systems that employ wide beamwidth, OCC may not impact system performance as the effects of OCC are not pronounced. However, for communication systems with narrow beamwidth and a large transmission distance such as on the order of a kilometer or more, OCC can become a concern in operation that can adversely affect communication quality or otherwise degrade system performance.

In some cases, OCC may increase due to environmental factors that affect the signal received by a communication device. Such disturbances may cause the receiver to perceive an artificial or augmented misalignment that differs from any actual misalignment. As a result of the perception of the artificial or augmented misalignment, the communication system may make adjustments to correct the artificial or augmented misalignment. Such adjustments may cascade in a series of iterations. If not addressed, this cascade effect may result in increasing actual misalignment and decreasing link efficiency.

BRIEF SUMMARY

According to one aspect, a method for adjusting an optical link alignment of a first communication device with a remote device is provided. The method comprises: transmitting an outbound optical signal from the first communication device to the remote device; receiving, at the first communication device, one or more measurements of at least one environmental factor at the first communication device or the remote device; receiving, at the first communication device, an indication of an apparent amount of alignment of the outbound optical signal; determining, by one or more processors of the first communication device, an estimated error attributable to optical cross coupling; determining, by the one or more processors of the first communication device, an actual amount of alignment of the outbound optical signal based on the apparent amount of alignment and the estimated error; adjusting, by the one or more processors, the first communication device based on the actual amount of alignment to correct for optical cross coupling. Adjusting the first communication device may include correcting for a misalignment between a target setpoint and the actual amount of alignment. The method may further comprise instructing the remote device to correct for a misalignment between a target setpoint and the actual amount of alignment.

In one example, determining, by the one or more processors of the first communication device, the estimated error attributable to optical cross coupling includes: comparing the one or more measurements of the at least one environmental factor to historical data; and determining the estimated error attributable to optical cross coupling based on the comparison of the one or more measurements of the at least one environmental factor to the historical data. In this case, determining, by one or more processors of the first communication device, the estimated error attributable to optical cross coupling may further include classifying, the one or more measurements of the at least one environmental factor as a particular environmental factor. The particular environmental factor may be a weather factor. Alternatively or additionally, the particular environmental factor may be an object or wildlife. Alternatively or additionally, the particular environmental factor may be elevation of the first communication device. Determining, by one or more processors of the first communication device, the estimated error attributable to optical cross coupling may further include determining whether the particular environmental factor is temporary. Here, determining the estimated error attributable to optical cross coupling may further include determining whether the particular environmental factor is persistent. Alternatively or additionally, upon determining that the estimated error is temporary, the method may then include ignoring the particular environmental factor in the estimated error determination.

According to another aspect, a method for adjusting an optical link alignment of a first communication device with a remote device is provided. The method comprises: receiving an inbound optical signal at a first communication device from a remote device; receiving, at the first communication device, one or more measurements of at least one environmental factor at the first communication device or the remote device; determining, at the first communication device, an apparent amount of alignment of the inbound optical signal; determining, by one or more processors of the first communication device, an estimated error attributable to optical cross coupling; determining, by the one or more processors of the first communication device, an actual amount of alignment of the inbound optical signal based on the apparent amount of alignment and the estimated error; and adjusting, by the one or more processors, the first communication device based on the actual amount of alignment to correct for optical cross coupling. The method may further comprise instructing the remote device to correct for a misalignment between a target setpoint and the actual amount of alignment.

According to a further aspect, a first communication device is provided that comprises a transmitter configured to transmit an outbound optical signal to a remote device, a receiver configured to receive an inbound optical signal from a remote device, and one or more sensors configured to detect one or more measurements of at least one environmental factor at the first communication device. The first communication device also comprises one or more processors configured to: determine an estimated error attributable to optical cross coupling, and determine an actual amount of alignment of the outbound optical signal or inbound optical signal based on an apparent amount of alignment and the estimated error. The first communication device further comprises a steering mechanism configured to adjust, when instructed by the one or more processors, the first communication device based on the actual amount of alignment to correct for optical cross coupling. The adjustment may include correction for a misalignment between a target setpoint and the actual amount of alignment.

In one example, the one or more processors are further configured to: compare the one or more measurements of the at least one environmental factor to historical data; and determine an estimated error attributable to optical cross coupling based on the comparison of the one or more measurements of the at least one environmental factor to the historical data. The one or more processors may be further configured to classify the one or more measurements of the at least one environmental factor as a particular environmental factor. The particular environmental factor may be a weather factor. The particular environmental factor may be an object or wildlife. Or the particular environmental factor may be an elevation of the first communication device.

DETAILED DESCRIPTION

Figure 1:
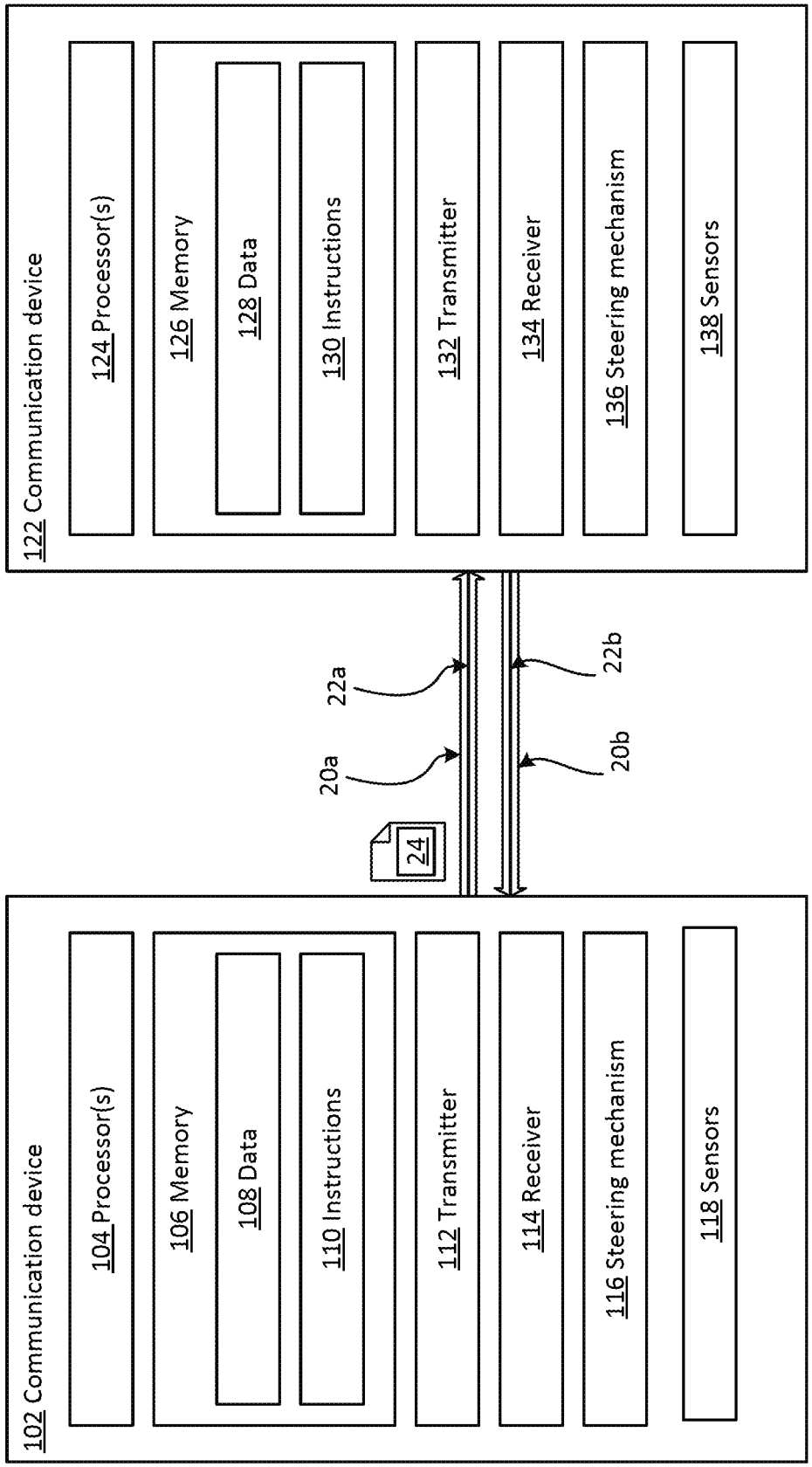
FIG. 1 is a block diagram of a first communication device and a second communication in accordance with aspects of the disclosure.

Implementations of the present disclosure are described in detail with reference to the drawing figures wherein like reference numerals identify similar or identical elements. It is to be understood that the disclosed implementations are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Example Systems

FIG. 1 is a block diagram 100 of a first communication device of a first communication terminal configured to form one or more links with a second communication device 122 of a second communication terminal, for instance as part of a system such as a free space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). In one aspect, the processor(s) may be configured to estimate an error associated with optical cross coupling and determine an actual outbound optical signal alignment based on environmental factors and an apparent amount of alignment for an outbound optical signal. Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may include an optical transmitter, an amplifier, and an attenuator. As shown in the example configuration of FIG. 2, the transmitter 112 includes a seed laser 202 configured to provide an amount of bandwidth for an output signal, an Erbium-doped fiber amplifier (EDFA) 204 configured to increase an amplitude of the output signal, and an attenuator 206 such as a variable optical attenuator (VOA) that may be a single mode variable optical attenuator (SMVOA) or a multi-mode VOA (MMVOA) that is configured to decrease the amplitude of the output signal. In addition, as shown in FIG. 1, the transmitter 112 may be configured to output a beacon beam 20 that allows one communication device to locate another, as well as a communication signal over a communication link 22. The output signal from the transmitter 112 may therefore include the beacon beam 20, the communication signal, or both. The communication signal may be a signal configured to travel through free space, such as, for example, a radio-frequency (RF) signal or optical signal, as shown by propagation path 214. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24 (not shown). As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

Figure 2:
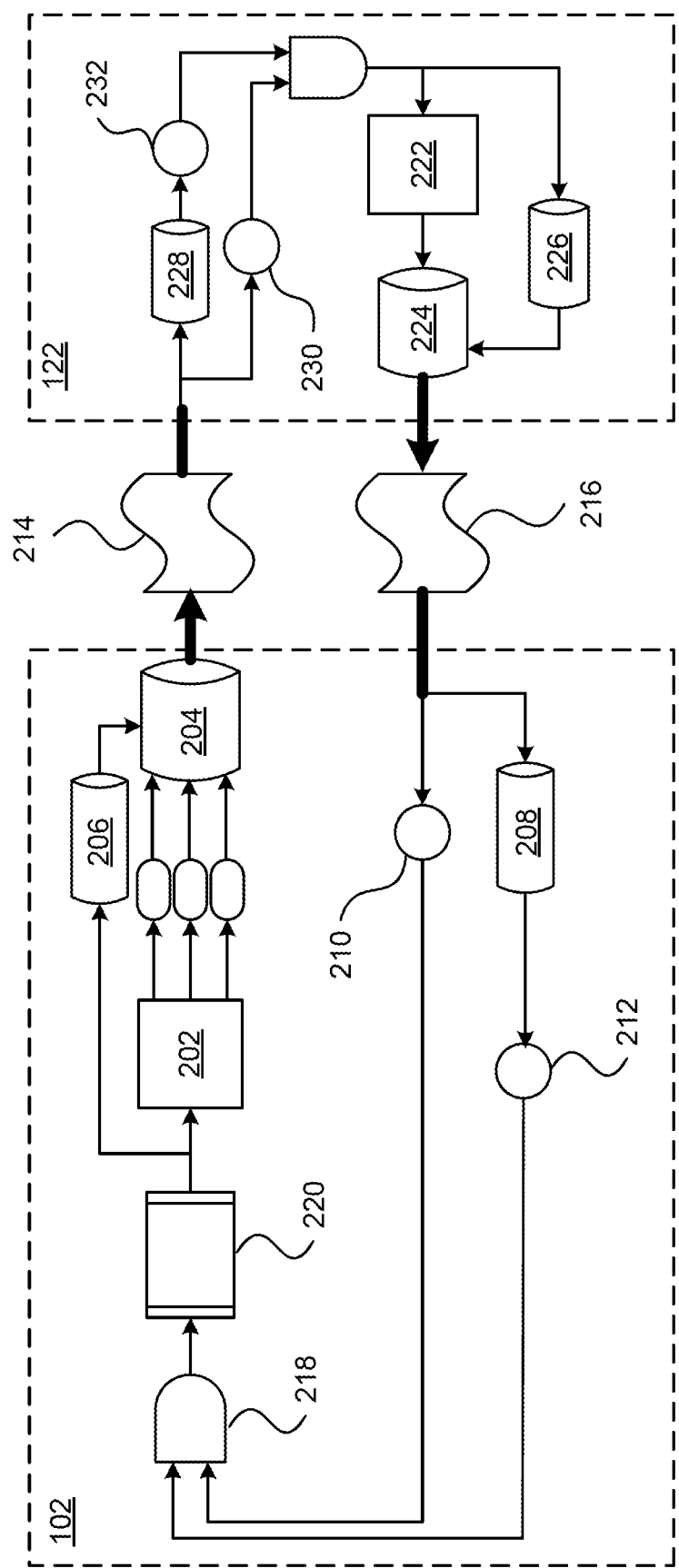
FIG. 2 is a pictorial diagram of components of the first communication device and the second communication device in accordance with aspects of the disclosure.

The receiver 114 includes a tracking system configured to detect an optical signal. As shown in the example of FIG. 2, the receiver 114 for the optical communication system may include an attenuator 208 such as a multi-mode variable optical attenuator configured to adjust an amplitude of a received signal, a photosensitive detector 210, and/or a photodiode 212. Using the photosensitive detector 210, the receiver 114 is able to detect a signal location and convert the received optical signal from propagation path 216 into an electric signal using the photoelectric effect. The receiver 114 is able to track the received optical signal, which may be used to direct the steering mechanism 116 to counteract disturbances due to scintillation and/or platform motion. The system may process the signal output from the photosensitive detector 210 by, e.g., performing integration, low-pass filtering and/or window-based sampling. In the example of FIG. 2, the resultant signal is combined with output from the attenuator 208 and photodiode 212 at block 218. The combined signal may then be processed by a controller 220, and its output controls operation of the seed laser 202 and attenuator 206. For instance, each communication channel could be adjusted independently as well, for example, by adjusting the seed laser powers for each channel.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezoelectric 2-axis mirror. The steering mechanism 116 may be configured to steer the transmitter, receiver, and/or optical signal in at least two degrees of freedom, such as, for example, yaw and pitch. The adjustments to the pointing direction may be made to acquire or align a communication link, such as communication link 22, between the first communication device 102 and the second communication device 122. To perform a search for a communication link, the one or more processors 104 may be configured to use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, may be configured to monitor a state of the first communication device 102. The one or more sensors may include an inertial measurement unit (IMU), encoders, accelerometers, or gyroscopes configured to measure one or more of pose, angle, velocity, torques, as well as other forces. In addition, the sensor(s) 118 may include one or more sensors configured to measure various environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include an optical transmitter, an amplifier, and an attenuator. As shown in FIG. 2, the transmitter 132 includes a seed laser 222 configured to provide an amount of bandwidth for an output signal(s), an amplifier 224 such as an EDFA configured to increase an amplitude of the output signal, and an attenuator 226, e.g., a SMVOA or MMVOA configured to decrease the amplitude of the output signal. As shown in FIG. 2, amplifier 224 causes the output signal to be sent along the propagation path 216. As noted above for first communication device 102, each communication channel sent from second communication device 122 could be adjusted independently as well, for example, by adjusting the seed laser powers for each channel. Additionally, as shown in FIG. 1, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes a tracking system configured to detect an optical signal as described above with respect to receiver 114. As shown in FIG. 2, the receiver 114 for the optical communication system may include a multi-mode variable optical attenuator 228 configured to adjust an amplitude of a received signal, a photosensitive detector 230, and/or a photodiode 232. Other components similar to those pictured in the first communication device 102 may also be included in the second communication device 122. Using the photosensitive detector 230, the receiver 134 is able to detect a signal location and convert the received optical signal into an electric signal using the photoelectric effect. The receiver 134 is able to track the received optical signal, which may be used to direct the steering mechanism 136 to counteract disturbances due to scintillation and/or platform motion.

Returning to FIG. 1, the one or more processors 124 are in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be RF communication links or other type of communication link capable of traveling through free space.

Figure 3:
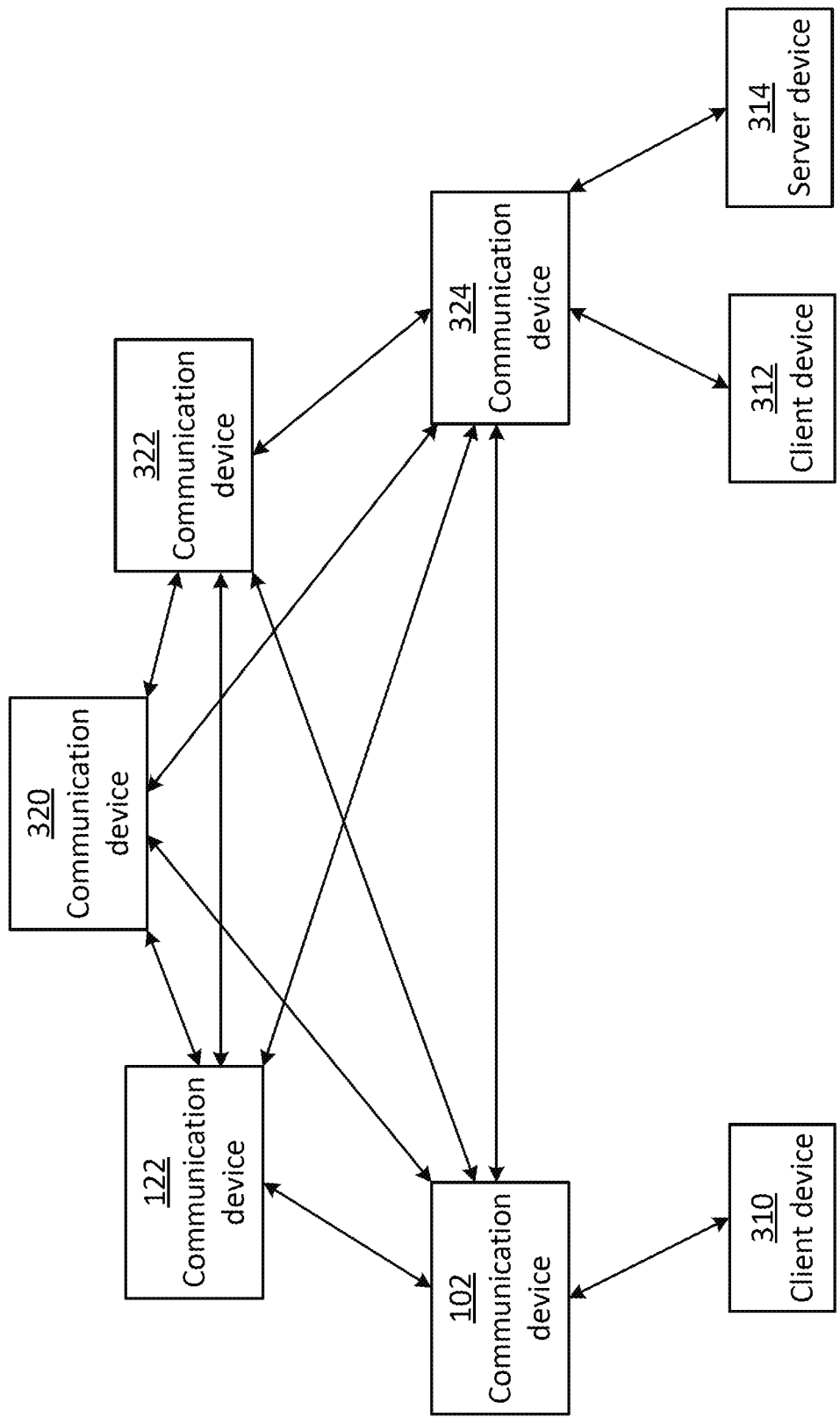
FIG. 3 is a pictorial diagram of a network in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 300. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transmitter, a receiver, and a steering mechanism similar to those described above. Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324. Each client device may be able to communicate with another client device and/or with a server device via one or more intermediary communication devices.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), or any other form of high-altitude platform such as those configured to operate in the stratosphere, or other types of moveable or stationary communication terminals. Additionally or alternatively, one or more communication devices may be satellites orbiting the Earth. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network, such as a cloud computing network that may comprise one or more remote server arrays.

Example Methods

While initiating a communication link, the one or more processors 104 of the first communication device 102 may adjust the target location or setpoint of the beam to correct for actual misalignment when forming a communication link with a remote communication device as described below. To establish a communication link, the first communication device 102 sends a free-space optical signal (beam) to a remote device, such as a second communication device 122 or a client device. The first communication device 102 may receive one or more measurements of environmental factors.

The one or more measurements may be received continually or at regular intervals, such as every 0.1 seconds or more or less. The one or more measurements of the environmental factors are received from the memory 106 of the first communication device 102 and the memory of the second communication device 122 or client device. The memory 106 of the first communication device 102 and the memory 106 of the second communication device are configured to store the one or more measurements of the environmental factors detected from one or more sensors 118, 138 of their respective communication devices. In some implementations, the one or more measurements of the environmental factors may be received from the remote communication device as raw data or processed data, such as a classification of a particular environmental factor. Alternatively, in some implementations, the one or more measurements of the environmental factors of the remote communication device are not received by the first communication device 102.

Figure 4:
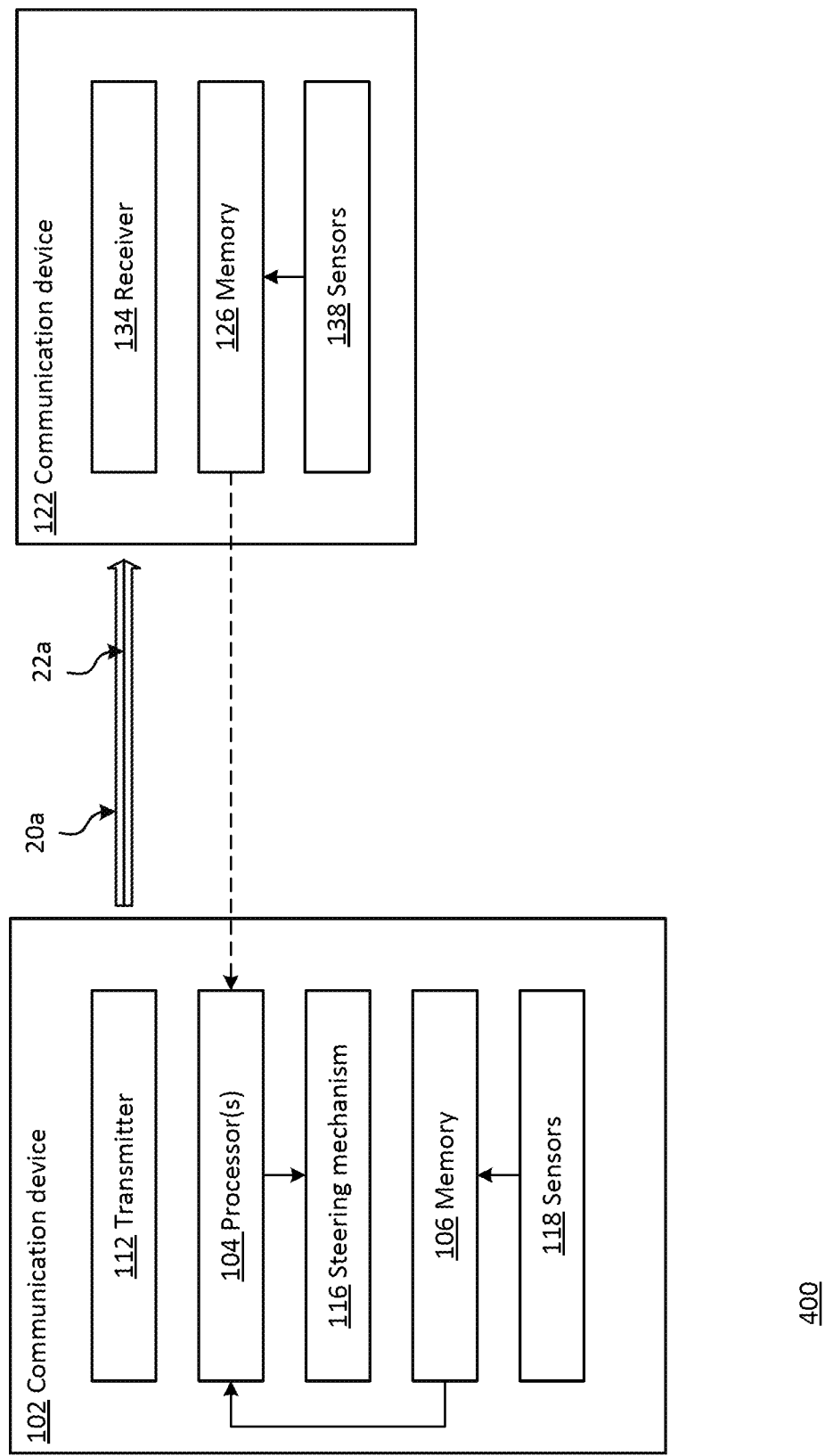
FIG. 4 is a block diagram of a first communication device and a second communication device in accordance with aspects of the disclosure.

For example, FIG. 4 illustrates the sensors 118 of the first communication device 102 directing information (e.g., one or more measurements of the environmental factors) to memory 106 and memory 106 providing information (e.g., one or more measurements of the environmental factors) to the one or more processors 104. Additionally, FIG. 4 illustrates the sensors 138 of the second communication device 122 directing information (e.g., one or more measurements of the environmental factors) to memory 126 and memory 126 optionally directing information (e.g., one or more measurements of the environmental factors) to the one or more processors 104 of the first communication device 102. This may be done via a communication link or other connection between the two communication devices.

The measurements of the environmental factors may include, by way of example, one or more of channel information, local system information, mount information, local tracking behavior of the communication device, and even manufacturing calibrations. Channel information may include power levels, noise levels, turbulence, frequency, polarization, or other characteristics of the channel or the beam transmitted on the channel. Local system information may include, frequency of vibration of the communication device, output power and/or altitude (e.g., height above ground level). Mount information may include orientation of the communication device and mount motion and be measured using an inertial measurement unit (IMU) (e.g., one or more gyroscopes or accelerometers) or other sensors, or inferred from other data. Tracking behavior may be known via the tracking controller's command output. Manufacturing calibrations may include sensor or transmit beam defocus information.

The second communication device 122 or client device may detect an apparent amount of alignment of the beam. The first communication 102 device may then receive an indication of the detected apparent amount of alignment of the beam from that remote device. Alternatively, the first communication 102 device may estimate an apparent amount of alignment of the beam at the remote communication device based on an apparent amount of alignment of a received beam from the remote communication device.

The one or more processors 104 of the first communication device 102 may implement an estimator module to determine if the apparent amount of alignment is actually a misalignment. In one implementation, the estimation by the one or more processors 104 bases this determination on the one or more measurements of the environmental factors of both the first communication device 102 and the remote communication device (e.g., second communication device 122) when one or more environmental factors from the remote communication device are available. For example, the one or more processors 104 may to account for the channel information of the system in order to estimate the behavior of the remote device (e.g., tracking angles and mount motion) and to account for channel disturbances. Estimating the behavior of the remote device can include determining an expected response of the remote device's tracking system (e.g., how the remote device's steering elements move). Alternatively, the actual response of the remote communication device may be communicated to the first communication device 102 from the remote communication device.

For example, when the one or more processors 104 accounts for the channel information and estimates or receives the behavior of the remote device to determine if there is misalignment, the estimator module may distinguish between the effects on channel information due to the mount motion, channel tip/tilt fluctuations, and the expected or actual response of the remote communication device. The channel information is based on the properties of the beam channel including spectral and amplitude properties (e.g., bounded amplitude). The one or more processors 104 may identify when the channel information indicates ideal channel conditions when there is no mount motion and no channel tip/tilt fluctuations (here, controller spectrum tracking a signal with no error), channel conditions including channel tip/tilt fluctuations and not including mount motion, or tracking with both mount motion and channel tip/tilt fluctuations. The one or more processors 104 may additionally identify channel information indicating that one or more channel properties are the result of the expected or actual response of the remote communication device.

In another implementation, when the one or more environmental factors from the remote communication device are not available, or when the remote communication device is a client device, the estimation process by the one or more processors 104 may only base the determination on the one or more measurements of the environmental factors that are available from the first communication device 102. In such an implementation, the one or more processors 104 may need to account for the channel information of the system in order to estimate the expected behavior of the remote device (e.g., tracking angles and mount motion).

There can be different approaches to estimation in accordance with aspects of the technology. As noted above, the channel has certain spectral and amplitude properties. There may also be identifiable spectral content for tracking with no mount motion and no channel tip/tilt fluctuations, in which case the controller spectrum tracking is based on a clean error signal. There may be tracking with no mount motion but including channel tip/tilt fluctuations (thus, spectrum of controller tracking, and of channel spectrum added to error signal), and tracking with mount motion and channel tip/tilt fluctuations (which includes the spectrum associated with the mount as well). There may also be an expected response of a remote terminal's tracking system, which occurs in response to the local terminal's tracking due to OCC. As such, the local terminal can have some knowledge (e.g., using information from unintended OCC's side-effects) of how the other terminal's beam steering elements are moving. Detecting such motion may be complicated by the channel's tip/tilt interference; however, in many cases they both have different spectral properties so they can be distinguished. When they cannot be distinguished, the channel cannot be learned. Here, single-ended OCC decoupling may be less effective than when they are distinguishable.

Thus, according to one approach, the system's operation could incorporate briefly switching one side's tracking to idle (to hold the beam steering elements stationary) while the other side tracks, and then alternating sides. This allows for determining error due to channel+remote side tracking spectra/time series properties without OCC components (since the local side is not tracking). Or, the system could incorporate temporarily idling/freezing both sides to determine mount motion of the opposite side. Here, the local terminal already measures its own mount motion, and therefore knows the effects of its mount motion on the error signal. The difference between that and the observed error properties (spectrum and time-series data) is dominantly due to the channel tip/tilt and remote terminal's mount motion as observed via OCC on the local tip/tilt sensor. Channel tip/tilt can be fairly well characterized over long periods, including times of no mount motion or tracking or via models that use the link setup parameters such as distance. Channel tip/tilt may also have a known maximum amplitude and spectral content. Mount motion may have larger amplitude that can therefore be an automatically distinguishing feature used to separate those large-amplitude components from channel fluctuation.

Using the determined channel properties (e.g., generally slowly varying over time, compared to the controller computation and tracking rate), and an understanding of remote mount motion (likewise slowly varying over time, compared to the controller computation and tracking rate), this may lead to inferred response spectra of the remote terminal's beam steering element. To summarize these assumptions from above, they include: the time constant of process variation rate compared to tracking rate, the OCC amount, and mount rotational motion being significantly larger in amplitude than channel tip/tilt. If mount motion is smaller in amplitude and rate than channel tip/tilt, then OCC compensation of mount motion would not be needed in any case, since the channel tip/tilt component would dominate the OCC error.

Using the various inferred spectra discussed above, the local terminal can infer if remote beam steering or channel tip/tilt dominate. With that information, the local terminal can run an algorithm that removes the local optical OCC components (as in the case of transmitted information), and removes OCC from beam steering when it's assumed that dominates. In cases where the channel dominates, only local optical OCC components may need to be removed, and remote beam steering (mount motion) is left intact and deemed benign and/or uncorrectable.

To determine whether the apparent amount of alignment is the actual amount of alignment (or if there is any misalignment), the one or more processors 104 (e.g., estimator) compares the one or more measurements of the environmental factors to historical data stored in the memory 106 as data 108. This comparison allows the one or more processors 104 to compare the one or more measurements of the environmental factors to historical data associated with known environmental conditions. This historical data may be based on gathered real-world data or simulated data.

The historical data may include environmental conditions such as temperature, weather phenomenon (e.g., rain, snow, fog, humidity, wind), elevation, wildlife, mount motion, or a type of object. In some implementations, the comparison of the one or more measurements of the environmental factors to historical data may include a classification of the one or more measurements of the environmental factors as a particular environmental factor. For example, based on the comparison, the one or more processors 104 may classify at least one of the measurements of environmental factors as temperature, weather phenomenon (e.g., rain, snow, fog, humidity, wind), elevation, wildlife, mount motion, or a type of object.

Using the results of the comparison, the estimator module of the one or more processors 104 determine an estimated error attributable to OCC. For example, the error associated with the particular environmental factor may be determined as the estimated error. The determination of the estimated error attributable to OCC may vary depending on the results of the comparison. In the determination of the estimated error, the one or more processors 104 utilizes atmospheric models and channel models that may be refined over time using collected data. Moreover, the error attributable to OCC is a function of link distance (the distance between the first communication device 102 and the second communication device 122 or remote device).

Different environmental conditions may be indicative of a magnitude of error. For example, when the environmental factors are classified as increased temperature and increased humidity, the error attributable to OCC is generally greater. In general, temperature and humidity are determined to be one or more of the classified environmental factors.

Similarly, when the environmental factors are classified as mount motion, error attributable to OCC increases based on the amount of mount motion. Thus, when mount motion is higher, that can increase the effects of OCC (e.g., the error attributable to OCC) since the tracking error may be larger in general with mount motion, so the received beam centroid signal is further from center, which then exacerbates the effects of OCC. In such situations, there can be a characterization of the different components of OCC as a function of the variables, so when those conditions occur in the field, there can be some assumption of what magnitude of OCC is occurring, and from what cause. The estimator module may adjust the determined error attributable to OCC according to multiple environmental factors. For example, the estimator module may determine increased error from both increased temperature and humidity and mount motion.

If one or more environmental factors do not correspond to historical data, generalized atmospheric and channel models can be used to determine the error attributable to OCC. The generalized models allow arbitrary input values which do not need to correspond to specific environmental factors.

In another implementation, determining the estimated error may include determining if an environmental condition causing an apparent amount of alignment is temporary or persistent. For example, based on the comparison between the one or more measurements of the environmental factors and the historical data, the estimator module of the one or more processors 104 may determine that at least part of the apparent amount of alignment is due to a temporary environmental condition, such as wildlife (e.g., a bird landing on the communication device) causing the signal to be disrupted. The one or more processors 104 may then determine that the error due to the temporary environmental condition is a temporary issue and not include the temporary error in the determination of the estimated error or misalignment. On the other hand, if the one or more processors 104 determines that the error is due to a persistent environmental condition, such as weather (e.g., fog, rain, snow) causing the signal to be disrupted, the one or more processors 104 may not ignore the persistent error in determining the estimated error or misalignment. By way of example, an environmental condition may be considered to be temporary if it is expected to last no more than X seconds (e.g., on the order of 1-30 seconds, up to 45 seconds, or no more than 60 seconds). In contrast, the environmental condition may be considered to be persistent if it is expected to last for at least Y seconds (e.g., between 60 seconds and 5 minutes, or last more than 45 seconds).

In some implementations, the estimator module may not determine an error for an environmental condition. An error may not be determined when the error is detected for less than a threshold value. The threshold value may correspond to the intervals of receipt of the one or more measurements, such as every 0.1 or 1.0 seconds or more or less. According to one aspect, if a transient phenomenon occurs below X seconds, it may be too fast for the estimator module to take it into account because, e.g., (a) it is/will be gone before the data even arrives at the terminal, to be used for compensation, or (b) it is too fast for an estimator to interpret the variation with confidence, and the phenomena will disappear before the effects can be identified).

In a further implementation, the estimator module will not determine an error if a particular environmental condition is determined to not be attributable to OCC. For example, if an environmental condition is classified as a power surge within the first communication device 102 or remote communication device, an error will not be calculated by the estimator module.

Then, the one or more processors 104 determines the actual amount of alignment, by, for example, subtracting the estimated error from the apparent amount of alignment, resulting in the actual amount of alignment. In some implementations, the determination by one or more processors 104 is conducted in both x-plane and the y-plane. The one or more processors 104 may repeat this determination at regular intervals, such as every 0.1 seconds or more or less. These intervals may or may not correspond to the receipt or collection of the one or more measurements of the environmental factors. The intervals also may or may not correspond to the update rate of the receiver of the remote device (e.g., receiver 134 of the second communication device 122).

The one or more processors 104 of the first communication device 102 may perform a correction based on the determined actual amount of alignment. For example, the correction may include, as depicted in FIG. 4, the one or more processors 104 instructing the steering mechanism 116 to adjust the target location, or setpoint of the sensor at the receiver, to account for the actual amount of alignment. This adjustment may be achieved by steering the mirrors of the first communication device 102 or by otherwise shifting the setpoint by shifting a phase of a generated signal at the sensor. If there is no error and the apparent amount of alignment is the actual amount of alignment, no corrections are performed. In some implementations, the first communication device 102 may instruct the second communication device 122 or client device to perform a correction in addition to, or instead of the correction performed by the first communication device 102.

Figure 5:
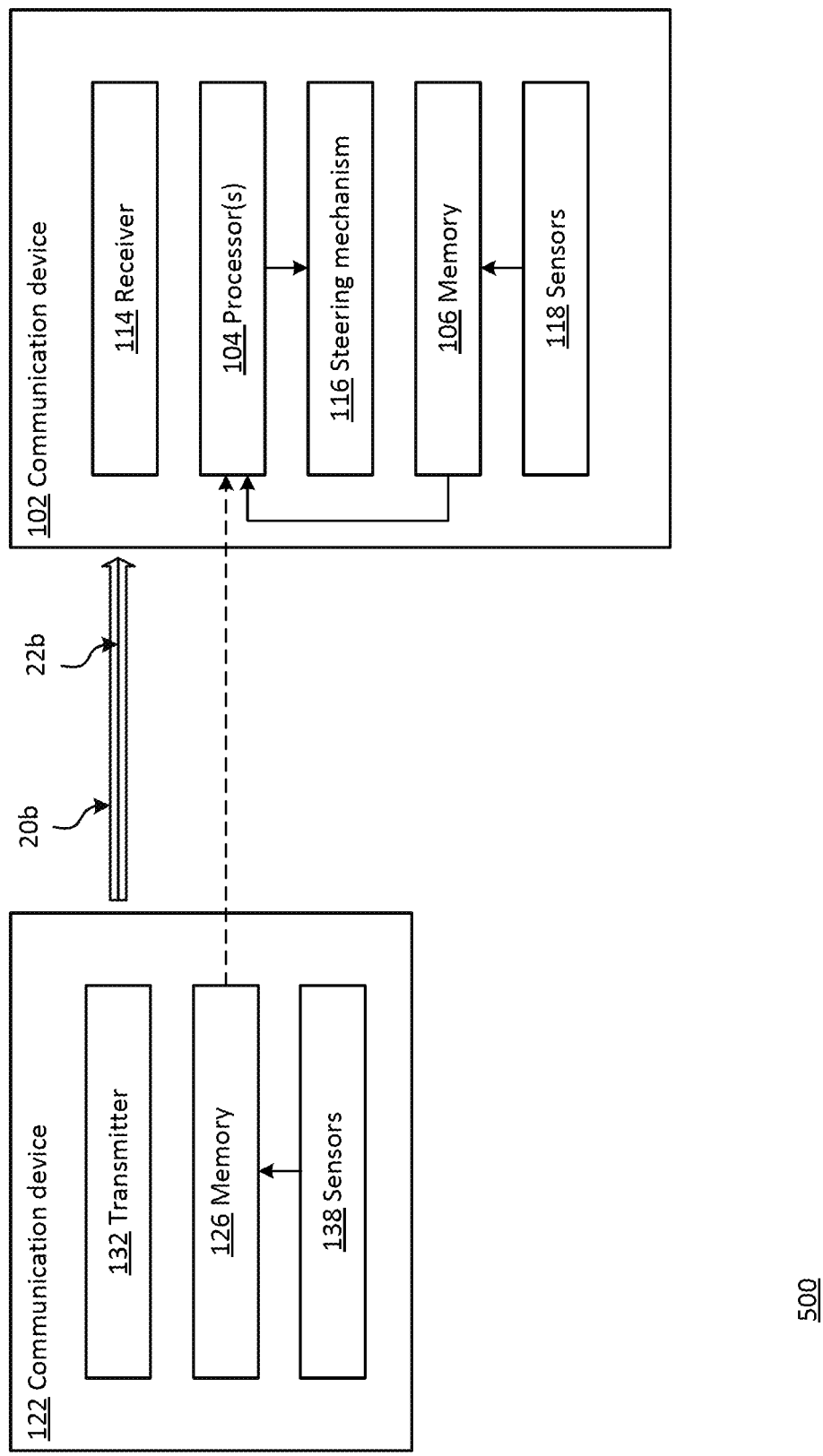
FIG. 5 a block diagram of a first communication device and a second communication device in accordance with aspects of the disclosure.

In some implementations, the above methodology may be implemented when a beam is received by the first communication device as depicted in, for example, FIG. 5. In such an implementation, the first communication device 102 receives a free-space optical signal (beam) to a remote device, such as a second communication device 122 or a client device at receiver 114. The first communication device 102 may also receive one or more measurements of environmental factors.

For example, FIG. 5 illustrates the sensors 118 of the first communication device 102 directing information (e.g., one or more measurements of the environmental factors) to memory 106 and memory 106 providing information (e.g., one or more measurements of the environmental factors) to the one or more processors 104. Additionally, FIG. 5 illustrates the sensors 138 of the second communication device 122 directing information (e.g., one or more measurements of the environmental factors) to memory 126 and memory 126 optionally directing information (e.g., one or more measurements of the environmental factors) to the one or more processors 104 of the first communication device 102. This may be done via a communication link or other connection between the two communication devices.

The first communication device 102 may detect an apparent amount of alignment of the beam. The apparent amount of alignment may be detected by, for example, a photosensitive detector 210 and/or photodiode 212 of the receiver 114.

The one or more processors 104 of the first communication device 102 may implement an estimator module of the one or more processors 104 to determine an actual amount of alignment. In one implementation, the estimation by the one or more processors 104 bases this determination on the one or more measurements of the environmental factors of both the first communication device 102 and the remote communication device (e.g., second communication device 122) when one or more environmental factors from the remote communication device are available.

The one or more processors 104 of the first communication device 102 may perform a correction based on the determined actual amount of alignment. For example, the correction may include, as depicted in FIG. 5, the one or more processors 104 instructing the steering mechanism 116 to adjust the target location, or setpoint of the sensor at the receiver, to account for the actual amount of alignment. This adjustment may be achieved by steering the mirrors of the first communication device 102 or by otherwise shifting the setpoint by shifting a phase of a generated signal at the sensor. If there is no error and the apparent amount of alignment is the actual amount of alignment, no corrections are performed. In some implementations, the first communication device 102 may instruct the second communication device 122 or client device to perform a correction in addition to, or instead of the correction performed by the first communication device 102.

In some implementations, the second communication device 122 can perform the determination concurrently with the first communication device 102. In such an implementation, the second communication device 122 may receive or transmit a free-space optical signal (beam) to the first communication device 102 and vice versa.

In such an implementation, each communication device may determine an error attributable to OCC based on one or more measurements of environmental factors at that device and make a correction accordingly. For example, the first communication device 102 makes an error determination and correction based on the environmental factors detected at the first communication device 102 and the second communication device 122 makes an error determination and correction based on the environmental factors detected at the second communication device 122.

Alternatively, both communication devices may utilize some or all of the one or more measurements of the environmental factors from the other device and utilize them in the determination and correction. Similarly, one or both of the devices may make corrections based on the error determinations of both devices.

In another implementation, one or more processors 124 of the second communication device 122 may determine an actual amount of alignment and corrective action may be taken according to the methodology detailed above. In such an implementation, the second communication device 122 would function in the same manner as the first communication device 102 when both transmitting and receiving beams from a remote communication device (e.g., the first communication device 102 or a client device).

In some implementations, in addition to performing a correction based on the determined actual amount of alignment, the one or more processors 102,124 of a communication device may perform a further correction based on a scaling factor. The factor may be more than 1×. The scaling factor is used to correct for OCC attributable to imperfect optics of the receiver 114, 134 and/or transmitter 112, 134. The scaling factor may be determined during manufacturing or while the link is in operation. When the scaling factor is determined during manufacturing, a full optical training process may be conducted on the receiver 114, 134 and/or transmitter 112, 134 (e.g., by moving an external calibration beam across the receiver by a known angle, and observing the error change on the terminal sensor, when the terminal beam steering elements are frozen or moving a beam from the transmitter 112,134, across and external calibration receiver). Alternatively, an optical train may be conducted on each optical section of the receiver 114, 134 and/or transmitter 112, 134 to determine the scaling factor. In another implementation, the scaling factor may be learned during operation.

Figure 6:
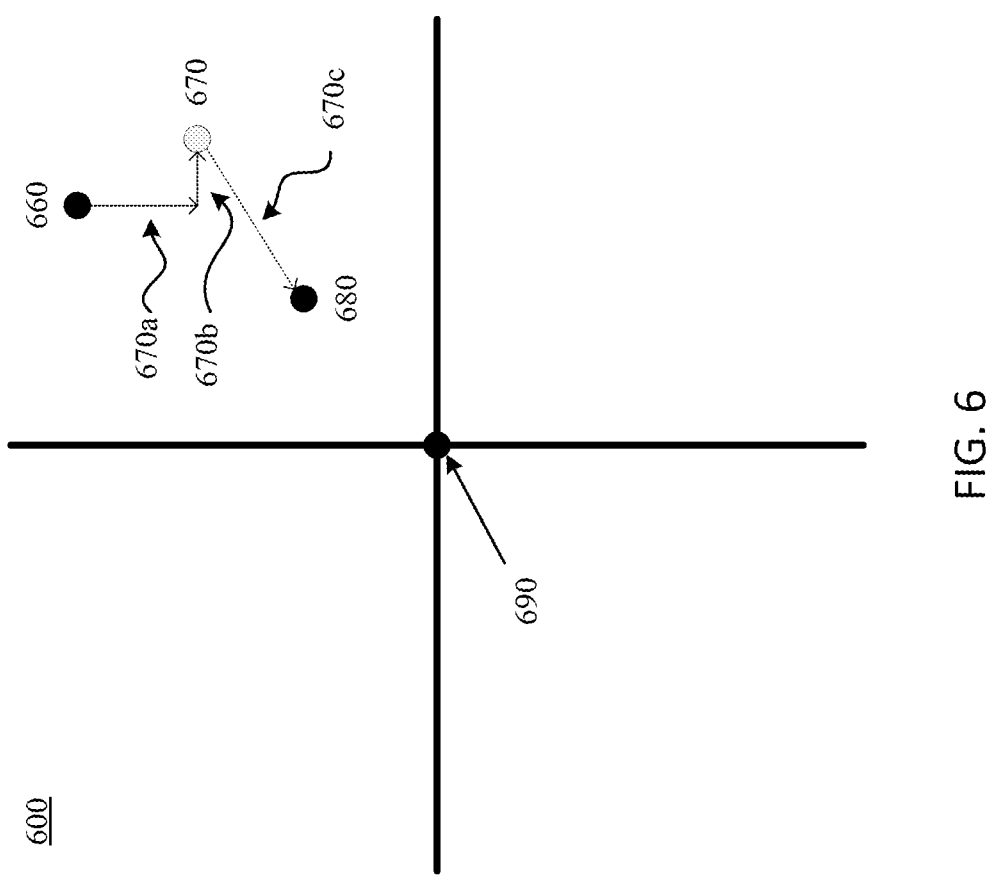
FIG. 6 is a pictorial diagram of results of a performed error correction in accordance with aspects of the disclosure.

FIG. 6 illustrates an example of a first correction based on the determined actual amount of alignment and a second correction the scaling factor over one interval. The receiver 114, 134 may detect a signal at a first position 660. The one or more processors 104, 124 may adjust the target location, or setpoint of the sensor at the receiver to a second position 670 by performing a correction in the y-plane (arrow 670*a*) and a correction in the x-plane (arrow 670*b*) based on the determined actual amount of alignment. Then, the one or more processors 104, 124 may adjust the target location, or setpoint of the sensor at the receiver to a third position 680 by applying a scaling factor as shown by arrow 670*c*. The correction at each interval is such that the final position is closer to the zero-error position 690 than the first position 660.

Figure 7:
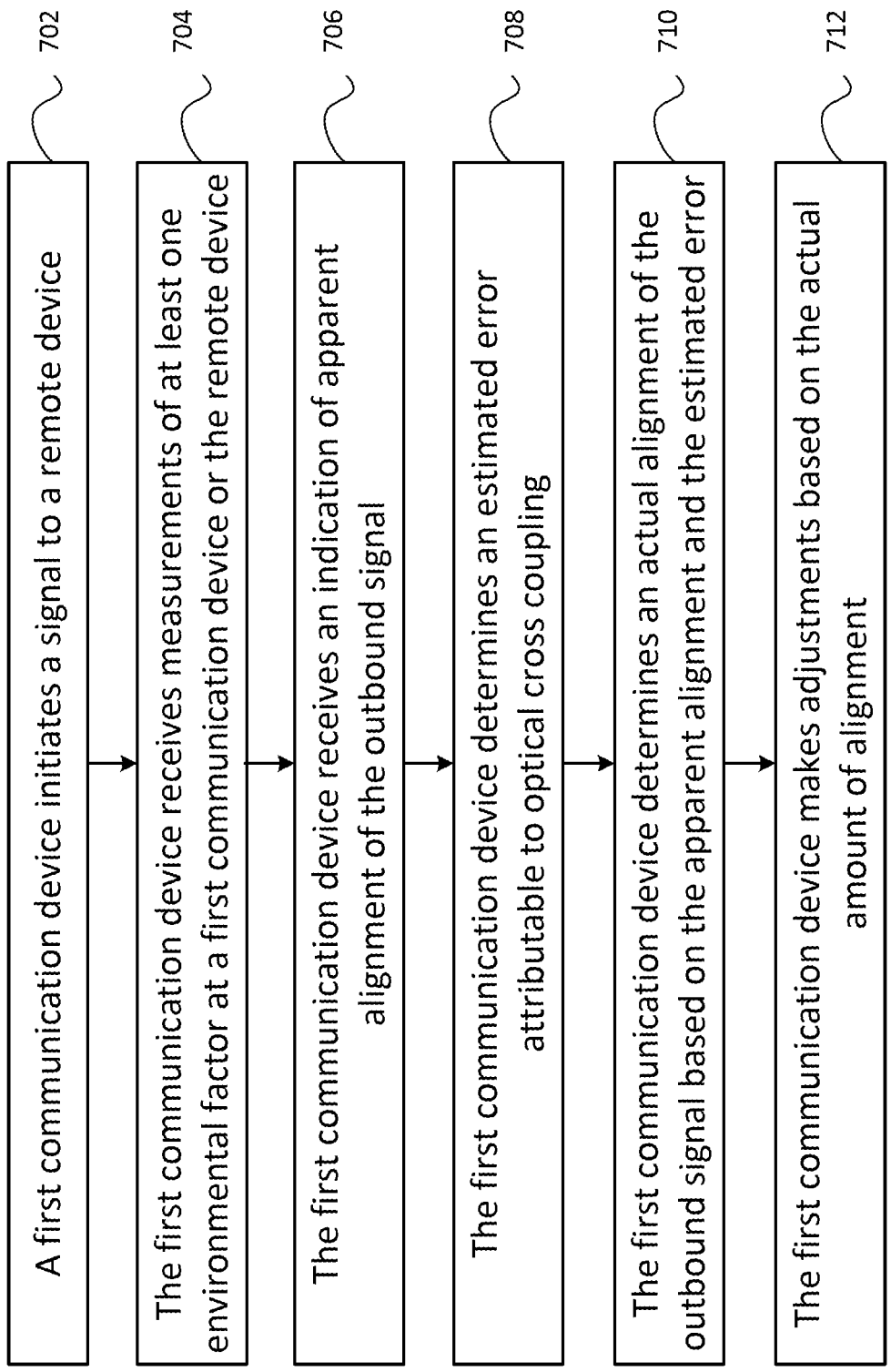
FIG. 7 is a flow diagram depicting a method in accordance with aspects of the disclosure.

FIG. 7 illustrates an exemplary method 700 according to the present disclosure, which includes adjusting an optical link alignment of a first communication device 102 with a remote communication device when the first communication device 102 initiates a signal. Step 702 describes the first communication device 102 initiating a signal to a remote communication device. Step 704 describes the first communication device 102 receiving measurements of at least one environmental factor of the first communication device 102 or the remote communication device. As discussed above regarding FIG. 4, the measurements may be detected by sensors 118 of the first communication device 102 or sensors 138 of a second communication device 122 or both and stored in memory 106 of the first communication device 102 and memory 138 of the second communication device 122 respectively. Then, the one or more processors 104 of the first communication device 102 may receive the measurements from memory 106 or memory 138 or both.

Step 706 describes the first communication device 102 receiving an indication of apparent alignment of the outbound signal. Step 708 describes the first communication device determining an estimated error attributable to OCC. The determination is based on measurements of the at least one environmental factor. In some implementations, the determination is additionally based on the comparison of the historical data stored in memory 106 and the measurements of the at least one environmental factor. Step 710 describes the first communication device 102 determining an actual alignment of the outbound signal based on the apparent alignment and the estimated error. The one or more processors 104 (e.g., an estimator module implemented by the processors according to instructions stored in memory) determines the actual amount of alignment, by, for example, subtracting the estimated error from the apparent amount of alignment, resulting in the actual amount of alignment. Finally, step 712 describes the first communication device 102 making adjustments based on the actual amount of alignment. The adjustments may include the one or more processors 104 instructing the steering mechanism 116 to adjust the target location or setpoint of the sensor at the receiver, to account for the actual amount of alignment. If there is no error and the apparent amount of alignment is the actual amount of alignment, no corrections are performed.

Figure 8:
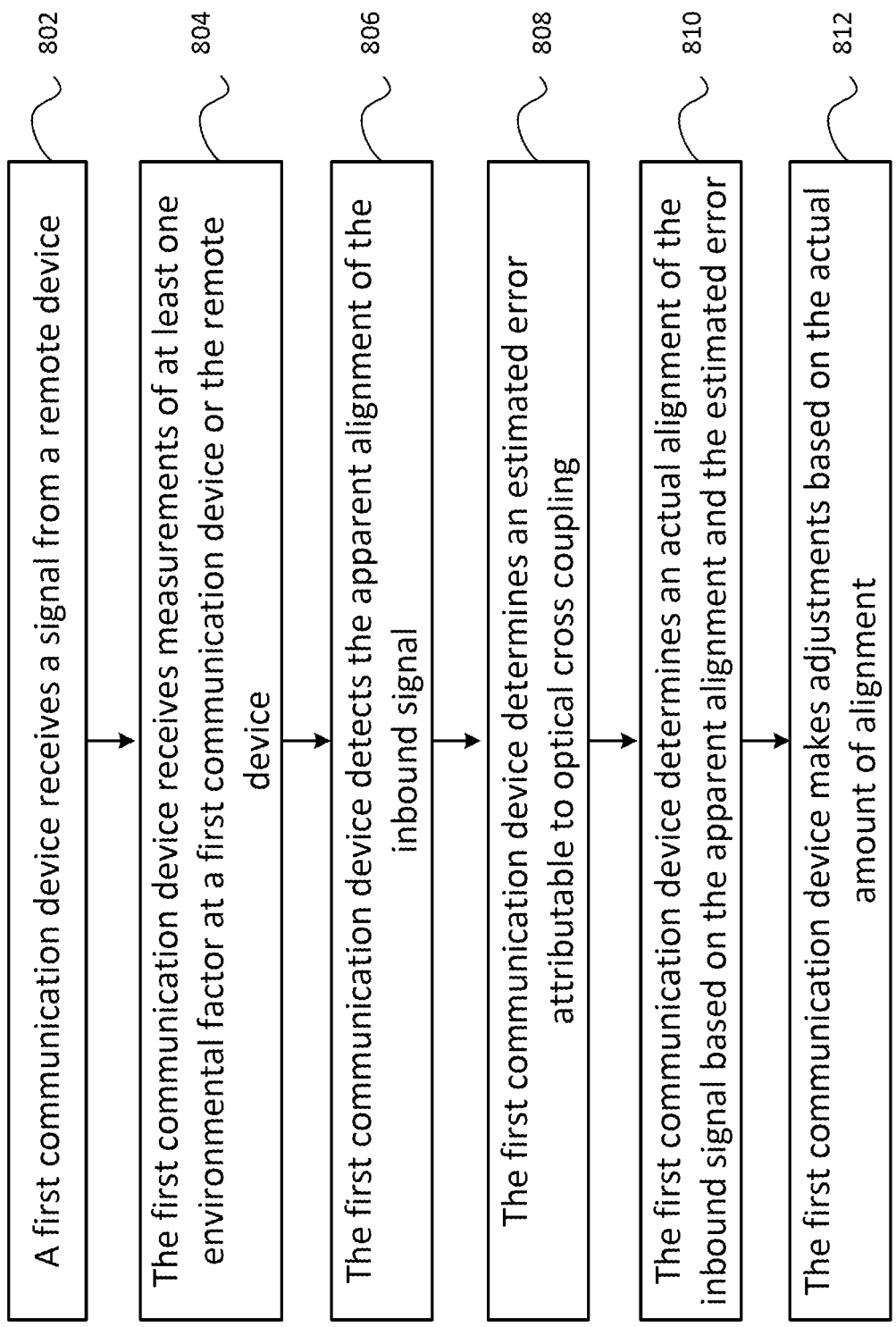
FIG. 8 is a flow diagram depicting a method in accordance with aspects of the disclosure.

FIG. 8 illustrates an exemplary method 800 of the present disclosure of adjusting an optical link alignment of a first communication device 102 with a remote communication device when the first communication device 102 receives a signal. Step 802 describes the first communication device 102 receiving a signal from a remote communication device. Step 804 describes the first communication device 102 receiving measurements of at least one environmental factor of the first communication device 102 or the remote communication device. As noted above regarding FIG. 5, the measurements may be detected by sensors 118 of the first communication device 102 or sensors 138 of a second communication device 122 or both and stored in memory 106 of the first communication device 102 and memory 138 of the second communication device 122 respectively. Then, the one or more processors 104 of the first communication device 102 may receive the measurements from memory 106 or memory 138 or both.

Step 806 describes the first communication device 102 detecting apparent alignment of the inbound signal. Step 808 describes the first communication device 102 determining an estimated error attributable to OCC. The determination is based on measurements of the at least one environmental factor. In some implementations, the determination is additionally based on the comparison of the historical data stored in memory 106 and the measurements of the at least one environmental factor. Step 810 describes the first communication device 102 determining an actual alignment of the inbound signal based on the apparent alignment and the estimated error. The one or more processors 104 (e.g., an estimator module implemented by the processors according to instructions stored in memory) determines the actual amount of alignment, by, for example, subtracting the estimated error from the apparent amount of alignment, resulting in the actual amount of alignment. Finally, step 812 describes the first communication device making adjustments based on the actual amount of alignment. The adjustments may include the one or more processors 104 instructing the steering mechanism 116 to adjust the target location or setpoint of the sensor at the receiver, to account for the actual amount of alignment. If there is no error and the apparent amount of alignment is the actual amount of alignment, no corrections are performed. In addition, or alternatively, the adjustments may include instructing the second communication device 122 to adjust the target location or setpoint.

The features and methodology described herein may provide an optical communication system the ability to maintain a communication link with less power output than a typical system and improved tracking capability that leads to higher communications performance, such as a lower bit error rate, higher signal to noise ratio, etc. The system allows for more precise beam targeting and more consistent connections due to the mitigation of the effects of OCC. Being able to distinguish between an apparent alignment and an actual alignment prevents unnecessary adjustments and allows for better coupling to a receiver, which improves link throughput, increases the link's tracking stability, and allows for operation over a broader range of link distances. The features described herein also allows for use of a narrower beam width, as well as fewer and or smaller components in the communication system, making the system more compact and efficient.

From the foregoing and with reference to the various figure drawings, those skilled in the art will appreciate that certain modifications can also be made to the present disclosure without departing from the scope of the same. While several implementations of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular implementations. Those skilled in the an will envision other modifications within the scope and spirit of the claims appended hereto.

The invention claimed is:

1. A method for adjusting an optical link alignment of a first communication device with a remote device, the method comprising:
   transmitting an outbound optical signal from the first communication device to the remote device;
   receiving, at the first communication device, one or more measurements of at least one environmental factor at the first communication device or the remote device;
   receiving, at the first communication device, an indication of an apparent amount of alignment of the outbound optical signal;
   determining, by one or more processors of the first communication device, an estimated error attributable to optical cross coupling;
   determining, by the one or more processors of the first communication device, an actual amount of alignment of the outbound optical signal based on the apparent amount of alignment and the estimated error; and
   adjusting, by the one or more processors, the first communication device based on the actual amount of alignment to correct for optical cross coupling.

2. The method of claim 1, wherein adjusting the first communication device includes correcting for a misalignment between a target setpoint and the actual amount of alignment.

3. The method of claim 1, further comprising instructing the remote device to correct for a misalignment between a target setpoint and the actual amount of alignment.

4. The method of claim 1, wherein determining, by the one or more processors of the first communication device, the estimated error attributable to optical cross coupling includes:
   comparing the one or more measurements of the at least one environmental factor to historical data; and
   determining the estimated error attributable to optical cross coupling based on the comparison of the one or more measurements of the at least one environmental factor to the historical data.

5. The method of claim 4, wherein determining, by the one or more processors of the first communication device, the estimated error attributable to optical cross coupling further includes classifying, the one or more measurements of the at least one environmental factor as a particular environmental factor.

6. The method of claim 5, wherein the particular environmental factor is a weather factor.

7. The method of claim 5, wherein the particular environmental factor is an object or wildlife.

8. The method of claim 5, wherein the particular environmental factor is elevation of the first communication device.

9. The method of claim 5, wherein determining, by the one or more processors of the first communication device, the estimated error attributable to optical cross coupling further includes determining whether the particular environmental factor is temporary.

10. The method of claim 9, wherein determining the estimated error attributable to optical cross coupling further includes determining whether the particular environmental factor is persistent.

11. The method of claim 9, wherein upon determining that the estimated error is temporary, the method further includes ignoring the particular environmental factor in the estimated error determination.

12. A method for adjusting an optical link alignment of a first communication device with a remote device, the method comprising:
   receiving an inbound optical signal at the first communication device from the remote device;
   receiving, at the first communication device, one or more measurements of at least one environmental factor at the first communication device or the remote device;
   determining, at the first communication device, an apparent amount of alignment of the inbound optical signal;
   determining, by one or more processors of the first communication device, an estimated error attributable to optical cross coupling;
   determining, by the one or more processors of the first communication device, an actual amount of alignment of the inbound optical signal based on the apparent amount of alignment and the estimated error; and
   adjusting, by the one or more processors, the first communication device based on the actual amount of alignment to correct for optical cross coupling.

13. The method of claim 12, further comprising instructing the remote device to correct for a misalignment between a target setpoint and the actual amount of alignment.

14. A first communication device, comprising:
   a transmitter configured to transmit an outbound optical signal to a remote device;
   a receiver configured to receive an inbound optical signal from a remote device;

one or more sensors configured to detect one or more measurements of at least one environmental factor at the first communication device;

one or more processors configured to:
  determine an estimated error attributable to optical cross coupling, and
  determine an actual amount of alignment of the outbound optical signal or inbound optical signal based on an apparent amount of alignment and the estimated error; and a steering mechanism configured to adjust, when instructed by the one or more processors, the first communication device based on the actual amount of alignment to correct for optical cross coupling.

15. The first communication device of claim 14, wherein the adjustment includes correction for a misalignment between a target setpoint and the actual amount of alignment.

16. The first communication device of claim 14, wherein the one or more processors are further configured to:

compare the one or more measurements of the at least one environmental factor to historical data; and determine an estimated error attributable to optical cross coupling based on the comparison of the one or more measurements of the at least one environmental factor to the historical data.

17. The first communication device of claim 16, wherein the one or more processors are further configured to classify the one or more measurements of the at least one environmental factor as a particular environmental factor.

18. The first communication device of claim 17, wherein the particular environmental factor is a weather factor.

19. The first communication device of claim 17, wherein the particular environmental factor is an object or wildlife.

20. The first communication device of claim 17, wherein the particular environmental factor is elevation of the first communication device.

* * * * *